United States Patent
Stepp, III

(10) Patent No.: US 6,487,463 B1
(45) Date of Patent: Nov. 26, 2002

(54) ACTIVE COOLING SYSTEM FOR AN ELECTRONIC DEVICE

(75) Inventor: George Thomas Stepp, III, Sioux City, IA (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/093,202

(22) Filed: Jun. 8, 1998

(51) Int. Cl.[7] ............................................. G05B 9/02
(52) U.S. Cl. ........................ 700/79; 700/299; 700/300
(58) Field of Search .................. 165/79, 80.3, 104.38; 361/695, 724, 690, 692, 693, 694; 700/29, 299, 300; 702/132

(56) References Cited

U.S. PATENT DOCUMENTS

| | | | |
|---|---|---|---|
| 5,355,122 A | 10/1994 | Erickson | 340/602 |
| 5,355,123 A | 10/1994 | Nishiura et al. | 340/653 |
| 5,477,417 A | * 12/1995 | Ohmori et al. | 361/695 |
| 5,526,229 A | 6/1996 | Wakabayashi et al. | 361/702 |
| 5,569,950 A | 10/1996 | Lewis et al. | 257/467 |
| 5,603,374 A | 2/1997 | Wu | 165/80.3 |
| 5,612,677 A | 3/1997 | Baudry | 340/584 |
| 5,615,084 A | 3/1997 | Anderson et al. | 361/697 |
| 5,676,199 A | 10/1997 | Lee | 165/80.3 |
| 5,906,315 A | * 5/1999 | Lewis et al. | 236/187 |
| 6,005,762 A | * 12/1999 | Hiroi | 361/103 |
| 6,101,459 A | * 8/2000 | Tavallaei | 702/132 |
| 6,134,667 A | * 10/2000 | Suzuki et al. | 713/300 |
| 6,157,897 A | * 12/2000 | Yoshikava | 702/132 |
| 6,243,656 B1 | * 6/2001 | Arai et al. | 702/132 |

OTHER PUBLICATIONS

Anonymous, "Vaiable–Speed Cooling Assembly for a Processor Chip", *IBM Technical Disclosure Bulletin*, vol. 38, No. 08, Aug. 1995.

* cited by examiner

*Primary Examiner*—Ayaz Sheikh
*Assistant Examiner*—Firmin Backer
(74) *Attorney, Agent, or Firm*—Suiter & Associates PC

(57) ABSTRACT

A system for actively cooling an electronic device is disclosed. The electronic device may be divided into a plurality of regions each containing one or more electrical or electronic components. A temperature sensor is positioned in each region to sense the temperature of the components contained in that region. Similarly, a temperature regulating device is positioned in each region. A controller monitors the temperature of each region as sensed by the temperature sensor and adjusts the amount of cooling provided to that region by the temperature regulating device, accordingly.

51 Claims, 3 Drawing Sheets

ACTIVE COOLING SYSTEM FOR AN ELECTRONIC DEVICE

FIELD OF THE INVENTION

The present invention relates generally to electronic devices such as computer systems, electronic test equipment, electronic office equipment, or the like, and more specifically to a system for actively cooling electrical and electronic components within an electronic device.

BACKGROUND OF THE INVENTION

The reliability and performance of an electronic device such as a computer system or the like are closely related to the temperature at which the device's internal electrical and electronic components must operate. For example, a typical computer system may include a number of integrated circuit components mounted on one or more circuit boards supported within the computer system's chassis or housing. During periods of heavy use, these components may generate excess heat which must be dissipated to prevent damage to the components or degradation of their performance.

For this reason, most computer systems include a forced air cooling system comprising one or more cooling fans mounted within the computer system's chassis. These cooling fans circulate air over the internal electrical and electronic components of the computer system so that any excess heat generated by the components may be dissipated via convection. However, certain components within the computer system, most notably Large-Scale Integration (LSI) or higher generation integrated circuit devices, such as the computer system's processor, may generate significantly more heat during operation than other, lower density, components. These components may be inadequately cooled by the conventional forced air cooling system resulting in the formation of localized "hot spots" (e.g., areas of elevated temperature) throughout the system.

Known to the art are spot cooling devices which may be used to cool components which generate an excessive amount of heat. Spot cooling devices typically comprise a miniature axial fan which draws air through a heat sink attached directly to the component. The air drawn through the heat sink by the fan removes excess heat from the component so that it may be more effectively dissipated by the forced air cooling system. Spot cooling fans are typically switched on or off depending on the mode of operation of the computer system. Alternatively, the speed of the fan may be controlled as a function of the temperature of the component which it is cooling. However, spot cooling fans operate independently of one another to cool a particular component. As a result, cooling of other components within the computer system may be adversely affected so that cooling of the computer system as a whole may be less than optimum.

Consequently, it would be advantageous to provide an integrated system for actively cooling an electronic device such as a computer system or the like, wherein the cooling system provides a proper amount of cooling to each electrical or electronic component within the device based on the temperature measured in the region surrounding that component.

SUMMARY OF THE INVENTION

Accordingly, the present invention provides a novel system for cooling the electrical and electronic components of an electronic device. The electronic device includes a plurality of regions each containing one or more electrical or electronic components which may generate heat during operation of the device. A temperature sensor is positioned in each region to sense the temperature of that region. A temperature regulating device such as, for example, a cooling fan, may provide cooling to the electrical or electronic components contained in the region. The temperature regulating device is operable at variable rates to adjust the amount of cooling provided to components in the region. A controller is operatively coupled to the temperature sensor and temperature regulating device of each region. The controller monitors the temperature of each region as sensed by the temperature sensor and varies the amount of cooling provided to that region by the temperature regulating device in proportion to the sensed temperature of the region. The controller also monitors the operation of each temperature regulation device to ensure that it is functioning properly.

It is to be understood that both the foregoing general description and the following detailed description are exemplary and explanatory only and are not restrictive of the invention claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
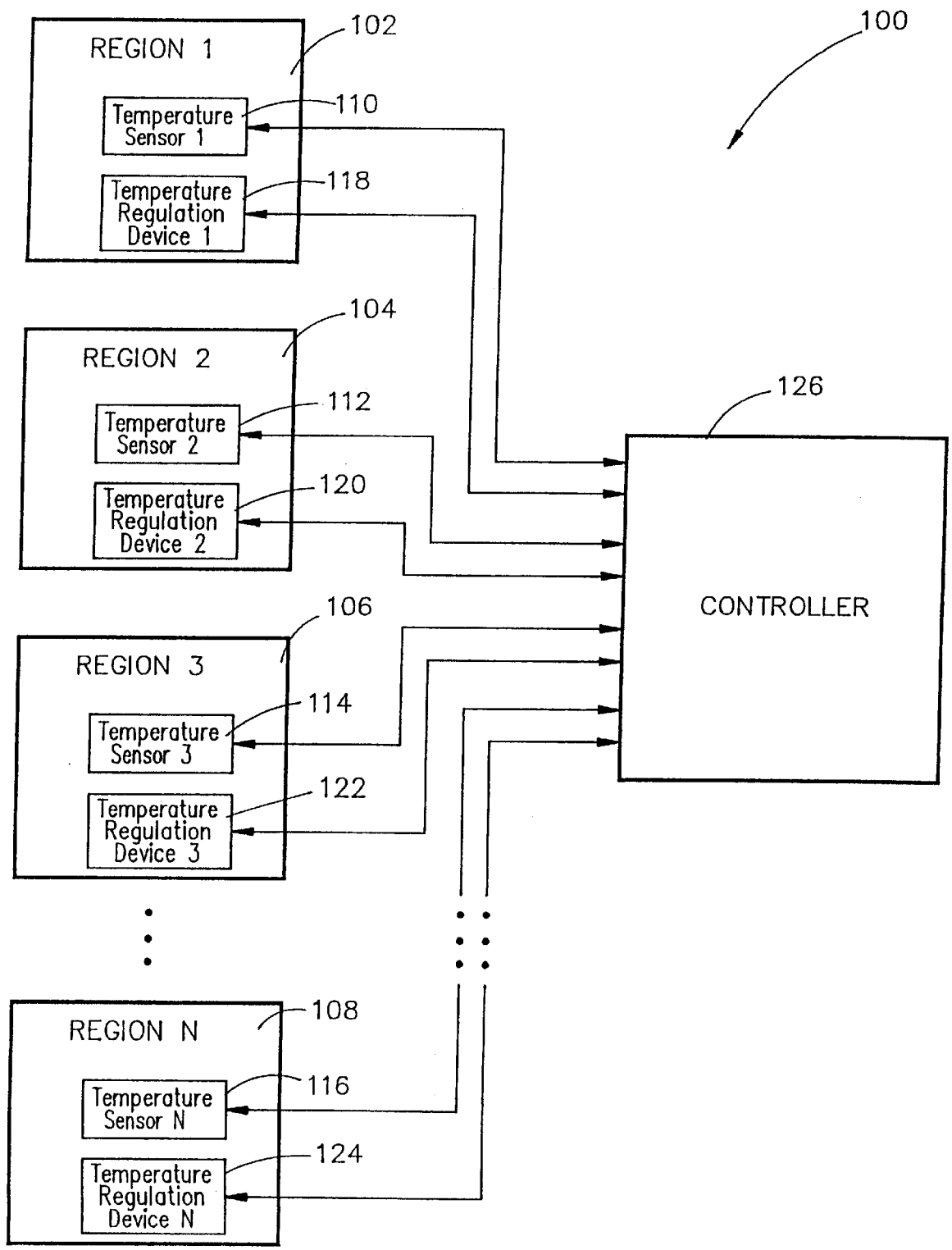
FIG. 1 is a block diagram depicting an active cooling system for an electronic device according to an exemplary of the present invention.

Referring now to FIG. 1, the active cooling system of the present invention is shown. The active cooling system 100 provides a means of actively controlling the amount of cooling provided to critical heat generating electrical and electronic components of an electronic device. As shown in FIG. 1, electrical and electronic components of the electronic device may be generally arranged into one or more regions ("REGION 1" through "REGION N") 102, 104, 106 & 108. Preferably, the number, type, and positioning of components in each region is controlled so that the temperature throughout the region is relatively uniform. Thus, a single component which generates a large amount of heat such as, for example, a high density integrated circuit device (e.g., a central processing unit) may occupy one region while several components which generate little heat during operation (e.g., several low density integrated circuit devices) may be grouped together in another region.

A temperature sensor 110, 112, 114 & 116 is positioned in each region 102, 104, 106 & 108 to measure the approximate temperature of components in that region. Preferably, the temperature sensor 110, 112, 114 & 116 is positioned to monitor temperatures either on or near the components contained within in the region. For example, the temperature sensor 110, 112, 114 & 116 may be placed directly on a component which generates a large amount of heat, such as a processor or power supply. Alternatively, the temperature sensor 110, 112, 114 & 116 may be positioned to sense an approximate or averaged temperature for all components in a region 102, 104, 106 & 108.

Similarly, a temperature regulating device 118, 120, 122 & 124 is positioned in each region 102, 104, 106 & 108 to provide cooling to the electrical or electronic components contained therein. Preferably, the temperature regulating device 118, 120, 122 & 124 is operable at variable rates so that the amount of cooling provided to the region 102, 104, 106 & 108 may be adjusted to adequately cool all components within the region. The temperature regulating device 118, 120, 122 & 124 may be, for example, an axial flow cooling fan which may cause air to be circulated through the region so that heat generated by components in the region may be dissipated via convection. The rotational speed of the cooling fan may be varied as a function of the temperature of the region by varying the voltage supplied to the fan. Preferably, the temperature regulating device 118, 120, 122 & 124 is positioned either on or near components within the region 102, 104, 106 & 108. For example, the temperature regulating device 118, 120, 122 & 124 may be placed directly on a component which generates a large amount of heat, such as a processor or power supply. Alternatively, the temperature regulating device 118, 120, 122 & 124 may be positioned to provide cooling to two or more components within a single region 102, 104, 106 & 108.

A controller 126 is operatively coupled to each temperature sensor 110, 112, 114 & 116 and temperature regulating device 118, 120, 122 & 124. The controller 126 monitors the temperature of each region 102, 104, 106 & 108 as sensed by the temperature sensor 110, 112, 114 & 116 and varies the amount of cooling provided to that region by the temperature regulating device 118, 120, 122 & 124 in proportion to the sensed temperature of the region. The controller 126 may also monitor the operation of each temperature regulation device 118, 120, 122 & 124 to ensure that it is functioning properly. If a failure of a temperature regulating device 118, 120, 122 & 124 is detected, the controller 126 may cause a warning to be provided to a user of the electronic device, or alternately, it may cause the device to be shut down to prevent damage to components in the affected region.

The controller 126 may adjust the amount of cooling provided to each region 102, 104, 106 & 108 so that dissipation of heat from the electronic device as a whole is optimized. For example, if the temperature of a particular region (e.g., "REGION 2" 104) becomes elevated, the controller 126 may increase the amount of cooling provided by the temperature regulation device 120 in that region. The controller 126 may also increase the amount of cooling provided by the temperature regulation devices 118 & 122 positioned in adjacent regions (e.g., "REGION 1" 102 and REGION 3" 106) to augment cooling of the overheated region ("REGION 2" 104). Further, the controller 126 may anticipate an increase in the temperature of one region 102, 104, 106 & 108 because elevated temperatures have been detected in another region. The controller 126 may then increase the amount of cooling provided to that region by its temperature regulation device 118, 120, 122 & 124 to prevent its temperature from rising. For example, a region (e.g., "REGION 1" 102) may contain an integrated circuit device such as microprocessor which during periods of heavy use may generate excess heat causing the temperature of "REGION 1" 102 to rise. The controller 126 may monitor the increase in temperature of "REGION 1" 102 via the temperature sensor 110 in that region 102, and anticipate a rise in temperature in another region such as, for example, "REGION 3" 106 which may contain a device such as a power supply, co-processor, memory controller or the like, which would be affected by the increased operation of the microprocessor in "REGION 1" 102. The controller 126 may then increase the amount of cooling provided to "REGION 2" 102 to circumvent a buildup of heat in the region.

Figure 2:
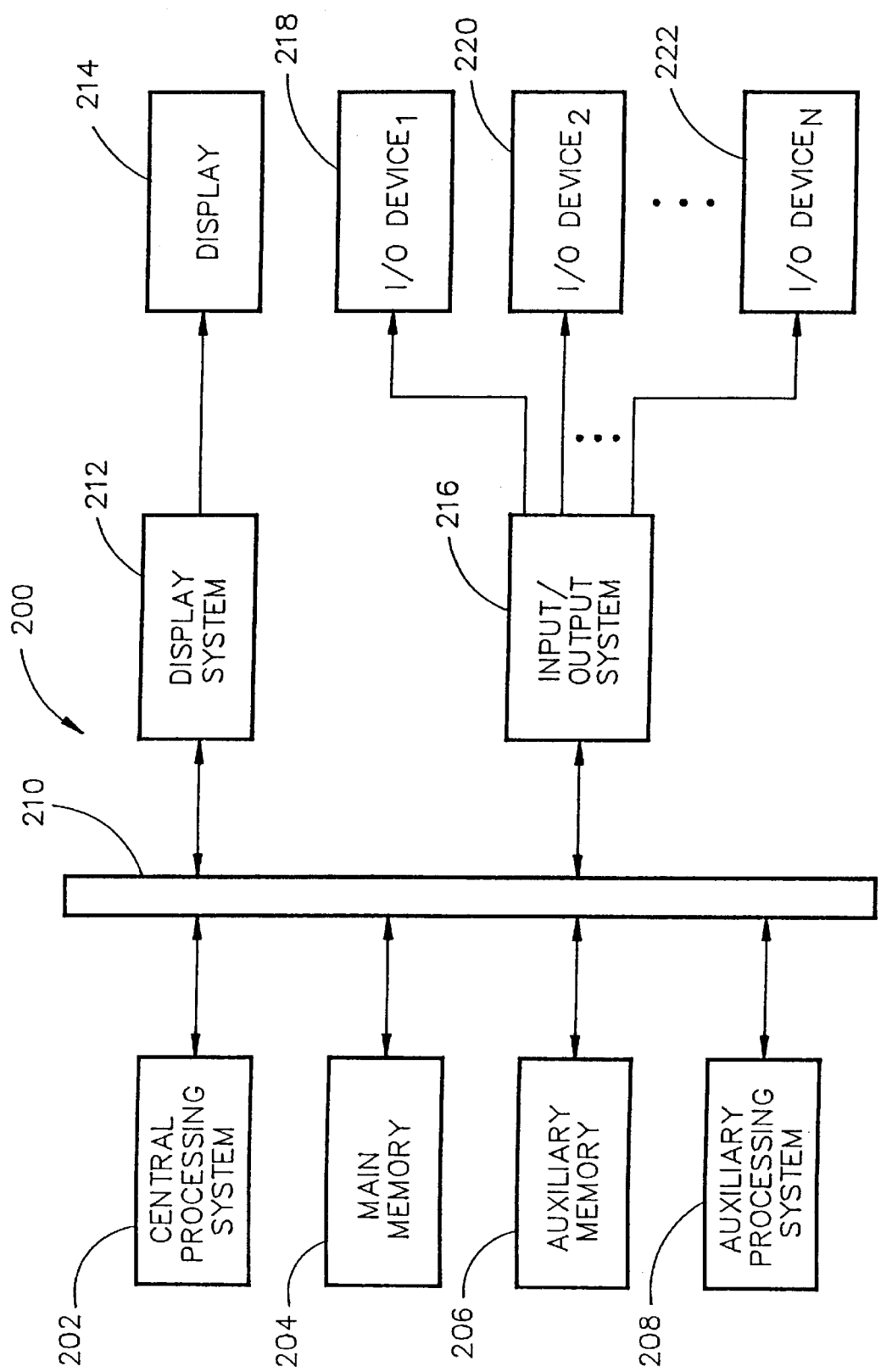
FIG. 2 is a block diagram depicting the hardware architecture of a typical computer system.

Referring now to FIG. 2, a typical computer system which may employ the active cooling system of the present invention is illustrated. The computer system 200 is controlled by a central processing system 202. The central processing system 202 includes a central processing unit such as a microprocessor or microcontroller for executing programs, performing data manipulations and controlling the tasks of the computer system 200. Communication with the central processing system 202 is implemented through a system bus 210 for transferring information among the components of the computer system 200. The bus 210 may include a data channel for facilitating information transfer between storage and other peripheral components of the hardware system. The bus 210 further provides the set of signals required for communication with the central processing system 202 including a data bus, address bus, and control bus. The bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the computer system 200 include main memory 204, auxiliary memory 206, and an auxiliary processing system 208 as required. The main memory 204 provides storage of instructions and data for programs executing on the central processing system 202. The main memory 204 is typically semiconductor based memory such as dynamic random access memory (DRAM) and or static random access memory (SRAM). The auxiliary memory 206 provides storage of instructions and data that are loaded into the main memory 204 before execution. The auxiliary memory 206 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The computer system 200 may optionally include an auxiliary processing system 208 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The computer system 200 further includes a display system 212 for connecting to a display device 214, and an input/output (I/O) system 216 for connecting to one or more I/O devices 218, 220 up to N number of I/O devices 222. The display system 212 may comprise a video display adapter having all of the components for driving the display device, including video random access memory (VRAM), buffer, and graphics engine as desired. The display device 214 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 216 may comprise one or more controllers or adapters for providing interface functions between the one or more I/O devices 218–222. For example, the input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 216 and I/O devices 218–222 may provide or receive analog or digital signals for communication between the hardware system 200 of the present invention and external devices, networks, or information sources. The input/output system 216 and I/O devices 218–222 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the computer system 200 of FIG. 2 by one having ordinary skill in the art would not depart from the scope or the spirit of the present invention.

Figure 3:
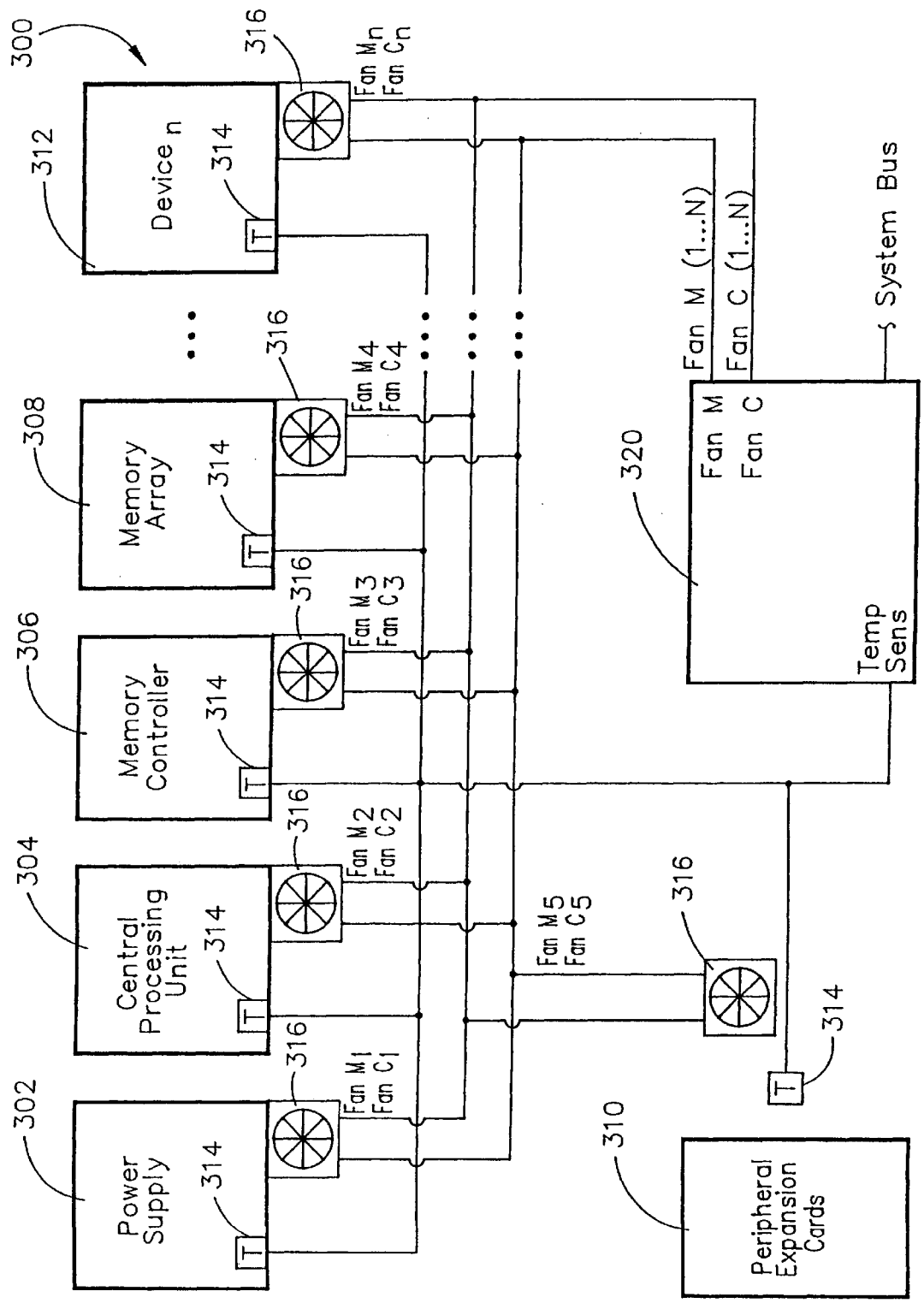
FIG. 3 is a block diagram illustrating an active cooling system employed by the computer system shown in FIG. 2.

Turning now to FIG. 3, the active cooling system of the present invention may be utilized to cool the computer system shown in FIG. 2. The active cooling system 300 provides a means of actively controlling the amount of cooling provided to critical heat generating electrical and electronic components 302–312 of the computer system 200 (see FIG. 2). Typically, such components may include, for example, a power supply 302, a central processing unit (CPU) 304, a memory controller 306, a memory array 308, peripheral expansion cards 310, or similar devices (e.g, "DEVICE N" 312).

A temperature sensor 314 is positioned near or directly on each of the electrical or electronic components 302–312. Each temperature sensor 314 senses the temperature of the area surrounding one or more of the components 302–312 such that the computer system may be effectively divided in to a plurality of cooling regions centered around the principal heat generating components therein. Preferably, each temperature sensor 314 includes a temperature sensitive device such as, for example, a thermistor, band-gap temperature sensor, or thermocouple which measures the temperature of the area immediately surrounding the component 302–312.

A cooling fan 316 may be positioned on or near each electrical or electronic component 302–312 to provide cooling to the component and the region generally surrounding it. The cooling fan 316 may be placed directly on a component which generates a large amount of heat, such as the power supply 302, central processing unit 304, memory controller 306. Alternatively, the cooling fan 316 may be positioned to cool a plurality of components uniformly. Preferably, each cooling fan 316 is a direct current axial flow fan which may cause air to be circulated through the region surrounding the device 302–312 so that heat generated by the component 302–312 may be dissipated therefrom via convection.

A controller 320 is operatively coupled to each temperature sensor 314 and cooling fan 316. The controller 320 monitors the temperature of each component 302–312 as sensed by its respective temperature sensor 314 and varies the amount of cooling provided to that component 302–312 in proportion to the sensed temperature thereof. The controller 320 may be, for example, a microprocessor system hardware monitor providing data acquisition and hardware monitoring of the computer system. The controller 320 may include a plurality of fan control outputs ("FAN C") for controlling the rotational speed of each cooling fan 316 within the system 300. The fan control outputs ("FAN C") are preferably voltage level signals which vary the voltage supplied to a respective one of the cooling fans 316 from a minimum voltage level, wherein the cooling fan 316 is stopped, to a maximum voltage level, wherein the cooling fan 316 is operated at its maximum rotational speed. In this manner, each of the cooling fans 316 may be turned off or allowed to ran at a low speed so that the fans produce less noise and use less power.

Communication of data and commands between the controller 320 and the central processing system may be provided via the system bus (see FIG. 2). At times, it may be impossible for a cooling fan 316 to dissipate a enough heat to sufficiently cool a component 302–312. The controller 320 may detect this condition take an appropriate action. For example, if the temperature sensed by a temperature sensor 314 exceeds a limiting value, which may be pre-set according to the maximum operating temperature of the component 302–312, the controller 320 may cause the central processing system to provide a warning to the user via the display device. Further, if the high temperature condition persists for a predetermined period of time, the controller 320 may cause the computer system to be shut off to prevent damage to that component or surrounding components.

Similarly, if a cooling fan 316 fails, the temperature of the component 302–312 cooled by that fan may rise to the point of possibly causing damage the component. The controller 320 may monitor the operation of each cooling fan 316 to ensure that it is functioning properly. Each cooling fan 316 may include a tachometer which monitors the speed of rotation of the fan. The controller 320 may include a plurality of fan monitoring inputs ("FAN M"). The fan monitoring inputs ("FAN M) receive signals from the tachometer output of each fan. If a failure of the cooling fan 316 is detected (i.e., the "FAN M" signal indicates that the speed of the fan is substantially different from the speed commanded) a warning may be provided to the user of the computer system or the system may be shut down.

It is believed that the active cooling system of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for cooling an electronic device having a plurality of regions each containing one or more electronic components wherein each of said plurality of regions may have a different temperature from other of said plurality of regions, said system comprising:
   a plurality of temperature sensors disposed within the electronic device, each of said plurality of temperature sensors positioned to sense within one of said plurality of regions for sensing the temperature of that region;
   a plurality of temperature regulation devices disposed within the electronic device, each of said plurality of temperature regulation devices positioned in a region monitored by one of said plurality of temperature sensors for cooling that region; and
   a controller operatively coupled to each of said plurality of temperature sensors and each of said plurality of temperature regulation devices, said controller monitoring the temperature of each of said plurality of regions sensed by the temperature sensor disposed in that region and controlling an amount of cooling provided by the temperature regulation devices disposed in said region in response thereto.

2. The system according to claim 1, wherein the controller varies the amount of cooling provided by each temperature regulation device in proportion to the sensed temperature of the region in which it is disposed.

3. The system according to claim 1, wherein the controller varies the amount of cooling provided by the temperature regulation device disposed in a first of said plurality of regions in response to the temperature sensed by the temperature sensor disposed in a second of said plurality of regions.

4. The system according to claim 3, wherein the first region and the second region are adjacent to each other.

5. The system according to claim 1, wherein the controller monitors the amount of cooling provided by each temperature regulation device.

6. The system according to claim 1, wherein at least one of said plurality of temperature sensors is positioned on an electronic component.

7. The system according to claim 1, wherein at least one of said plurality of temperature regulation devices is positioned on an electronic component.

8. The system according to claim 1, wherein each of said temperature regulation devices is a cooling fan.

9. The system according to claim 8, wherein the controller varies the amount of cooling provided by each cooling fan in proportion to the sensed temperature of the region in which it is disposed.

10. The system according to claim 8, wherein the controller varies the amount of cooling provided by the cooling fan disposed in a first of said plurality of regions in response to the temperature sensed by the temperature sensor disposed in a second of said plurality of regions.

11. The system according to claim 10, wherein the first region and the second region are adjacent to each other.

12. The system according to claim 8, wherein each cooling fan comprises a rotary cooling fan having a speed of rotation and the amount of cooling provided to each region is controlled by varying the speed of rotation of the cooling fan disposed in that region.

13. The system of claim 12, wherein the controller controls the speed of rotation of each cooling fan by varying the voltage supplied thereto.

14. The system according to claim 8, wherein the controller monitors the speed of rotation of each cooling fan.

15. The system according to claim 8, wherein at least one of the cooling fans is position on an electronic component.

16. A system for cooling a computer having a plurality of regions each containing one or more electronic components wherein each of said plurality of regions may have a different temperature from other of said plurality of regions, said system comprising:
   a temperature sensor disposed in each of said plurality of regions;
   a temperature regulating device disposed in each of said plurality of regions, said temperature regulating device operable at variable rates for adjusting an amount of cooling provided to said region; and
   a controller operatively coupled to the temperature sensor and temperature regulating device of each of said plurality of regions, said controller monitoring the temperature of each region sensed by the temperature sensor and varying the amount of cooling provided by the temperature regulating device disposed in said region in proportion to the sensed temperature of that region.

17. The system according to claim 16, wherein the controller varies the amount of cooling provided by the temperature regulation device disposed in said region in response to the temperature sensed by the temperature sensor disposed in a second region.

18. The system according to claim 17, wherein said second region is adjacent to said region.

19. The system according to claim 16, wherein the controller monitors the amount of cooling provided by each temperature regulation device.

20. The system according to claim 16, wherein the temperature sensor is positioned on an electronic component within the region.

21. The system according to claim 16, wherein the temperature regulation device is positioned on an electronic component within the region.

22. The system according to claim 16, wherein the temperature regulation device is a cooling fan.

23. The system according to claim 22, wherein the controller varies the amount of cooling provided by the cooling fan disposed in the region in response to the temperature sensed by the temperature sensor disposed in a second region.

24. The system according to claim 23, wherein the first region and the second region are adjacent to each other.

25. The system according to claim 22, wherein each cooling fan comprises a rotary cooling fan having a speed of rotation and the amount of cooling provided to each region is controlled by varying the speed of rotation of the cooling fan in that region.

26. The system of claim 25, wherein the controller controls the speed of rotation of the cooling fan by varying the voltage supplied thereto.

27. The system according to claim 22, wherein the controller monitors the speed of rotation of each cooling fan.

28. The system according to claim 22, wherein the cooling fan is positioned on an electronic component disposed in the region.

29. A system for cooling a computer having a plurality of regions containing electronic components wherein each of said plurality of regions may have a different temperature from other of said plurality of regions, said system comprising:

means, disposed in each of said plurality of regions, for sensing the temperature of said region;

means, disposed in each of said plurality of regions, for regulating the temperature of said region; and means for monitoring the temperature of each region via the temperature sensing means and controlling the temperature regulating means for regulating the temperature within that region in response thereto.

30. The system according to claim 29, further comprising means for monitoring the operation of each temperature regulation device.

31. The system according to claim 29, further comprising means for varying the amount of cooling provided by the temperature regulation means disposed in a first of said plurality of regions in response to the temperature sensed by the temperature sensing means disposed in a second of said plurality of regions.

32. The system according to claim 31, wherein the first region and the second region are adjacent to each other.

33. A method for cooling an electronic system having a plurality of regions containing electronic components wherein each of said plurality of regions may have a different temperature from other of said plurality of regions, the method comprising the steps of:

sensing the temperature of each region via a temperature sensor placed in the region; and varying the amount of cooling provided to each region by a temperature regulation device disposed within that region according to the sensed temperature thereof.

34. A method according to claim 33, further comprising the step of monitoring the operation of each temperature regulation device.

35. A method according to claim 33, wherein the temperature sensing step further comprises detecting the temperature of an electronic component within the region.

36. A method according to claim 33, further comprising the step of varying the amount of cooling provided to a first region by a temperature regulation device according to the sensed temperature of a second region.

37. An information handling system incorporating a cooling system, comprising:

a processor unit;

memory interconnected with the processor unit;

a display driver;

an input/output system; and a cooling system further comprising:
  a temperature sensor disposed in each of a plurality of regions within the information handling system;
  a temperature regulating device disposed in each of the plurality of regions, the temperature regulating device operable at variable rates to adjust an amount of cooling provided to the region; and
  a controller operatively coupled to the temperature sensor and temperature regulating device of each of the plurality of regions, the controller monitoring the temperature of each region and varying the amount of cooling provided by the temperature regulating device disposed in the region in proportion to the sensed temperature of that region.

38. The information handling system according to claim 37, wherein the controller varies the amount of cooling provided by each temperature regulation device in proportion to the sensed temperature of the region in which it is disposed.

39. The information handling system according to claim 37, wherein the controller varies the amount of cooling provided by the temperature regulation device disposed in a first of the plurality of regions in response to the temperature sensed by the temperature sensor disposed in a second of the plurality of regions.

40. The information handling system according to claim 39, wherein the first region and the second region are adjacent to each other.

41. The information handling system according to claim 37, wherein the controller monitors the amount of cooling provided by each temperature regulation device.

42. The information handling system according to claim 37, wherein at least one of the plurality of temperature sensors is positioned on an electronic component.

43. The system according to claim 38, wherein at least one of the plurality of temperature regulation devices is positioned on an electronic component.

44. The information handling system according to claim 37, wherein each of the temperature regulation devices is a cooling fan.

45. The information handling system according to claim 44, wherein the controller varies the amount of cooling provided by each cooling fan in proportion to the sensed temperature of the region in which it is disposed.

46. The information handling system according to claim 45, wherein the controller varies the amount of cooling provided by the cooling fan disposed in a first of the plurality of regions in response to the temperature sensed by the temperature sensor disposed in a second of the plurality of regions.

47. The information handling system according to claim 46, wherein the first region and the second region are adjacent to each other.

48. The information handling system according to claim 44, wherein the amount of cooling provided to each region is controlled by varying the speed of rotation of the cooling fan disposed in that region.

49. The information handling system of claim 48, wherein the controller controls the speed of rotation of each cooling fan by varying the voltage supplied thereto.

50. The information handling system according to claim 44, wherein the controller monitors the speed of rotation of each cooling fan.

51. The information handling system according to claim 45, wherein at least one of the cooling fans is positioned on an electronic component.

* * * * *